April 16, 1968

H. HOPKES, JR

Re. 26,373

SINUOUS SPRING STRIP

Original Filed Dec. 21, 1961

INVENTOR.
Henry Hopkes, Jr.

BY

Barnard, McGlynn & Reising
ATTORNEYS

United States Patent Office

Re. 26,373
Reissued Apr. 16, 1968

26,373
SINUOUS SPRING STRIP

Henry Hopkes, Jr., Grosse Pointe Park, Mich., assignor, by mesne assignments, to Lear Siegler, Inc., Santa Monica, Calif., a corporation of Delaware Original No. 3,244,414, dated Apr. 5, 1966, Ser. No. 407,072, Oct. 28, 1964, which is a continuation of Ser. No. 166,733, Dec. 21, 1961, which is a continuation-in-part of Ser. No. 721,601, Mar. 14, 1958. Application for reissue Sept. 8, 1967, Ser. No. 669,986
12 Claims. (Cl. 267—110)

Matter enclosed in heavy brackets [ ] appears in the original patent but forms no part of this reissue specification; matter printed in italics indicates the additions made by reissue.

This invention relates to an improved sinuous spring strip of the type having alternately oppositely facing loop portions connected together by transversely extending straight [portion] *portions*. More particularly, the invention relates to an improved spring strip of this type in which the length of the straight portions is so related to the length of the loop portions as to provide optimum spring characteristics and simultaneously to minimize the amount of spring stock used in forming the strip, and is a continuation of Ser. No. 166,733, filed Dec. 21, 1961, now abandoned, *which application is a continuation-in-part of application Ser. No. 721,601, filed on Mar. 14, 1958.*

The sinuous spring strips heretofore employed in the art were made of wire which was bent back and forth about pins to produce oppositely presenting loops along the strip edges joined by straight portions of the wire. The loops were struck on a radius which was between one half and one third smaller than the straight wire portion. For seating use a spring strip was provided having loops which were struck on a radius of approximately ⅜ inch, while the straight portions had a length of approximately 1¼ inches. Thus, the straight length portions of the spring strips were over three times longer than the radius of the loops thereof. The loops of small radius embodied strength which prevented their beinding when a section of the spring strip was loaded. The resistance to deflection when the spring strip was loaded was produced by a force in torque attempting to twist the straight wire portions of the strips. Thus, in view of the rigidity of the loops, increasing support due to the increased deflection and load was provided by the torque on the straight wire portions of the strip located between the loops.

It has now been found after many years of development of sinuous spring strips of this type that a better control may be obtained for the contouring of a loading section of the strip if the radius of the loops is substantially increased and the length of the straight portions joining the loops is substantially decreased. Tests have proven that the proper ratio between these dimensions for producing the desired contour, that required for comfort, is obtained when the radius of the loops of the wire strips is substantially equal to the length of the straight portions of wire which join the wire loops. Thus, for a given wire size and a given strip width, a different action is obtained for sections of the spring strips forming a seating area when the radius of the loops is approximately equal to the length of the straight portions therebetween than for strips having the straight portions between the loops substantially three times longer than the loop radius.

It has now been found that the larger loops of substantially the same gauge of wire bend lengthwise on the strip adding materially to the contouring of the surface of the plurality of strips of a cushion when loaded. The greater spacing of the short lengths of wire resulting from the greater radius of the loops produces substantially the same degree of pressure at various points along the length of spring strip to the load as that of a spring having longer straight portions joining loops of substantially shorter radius due to placing the straight portions closer together. The shorter the length of a wire subjected to torque the greater the resistance of the wire against twisting or deflection.

The use of spring strips having large radius loop portions and short straight portions provides a further advantage, that of requiring substantially less wire to form a seating area. Comparing the prior art spring strips of this type with the spring strips of the present invention of similar width and made of similar gauge and grade of wire stock, the spring strip according to the invention requires less wire stock since the transverse straight portions besides being shorter are also fewer in number due to the greater length of the loops. By maintaining the same width of the spring having the loop radius approximately equal to the length of the straight portions, a spring strip has been produced which permits the loops to bend at the time a torsional force is applied to the straight portions, bending of the loops and the twisting of the straight portions cooperating to produce the contouring, the desired pressure, and the resistance to deflection for the applied load. The spring strip in which the loop radius is substantially equal to the length of the transverse straight portions is entirely different in appearance and operation from other types of spring strips of a sinuous form which lack this relationship.

Some of the advantages of the spring strip of this invention reside in the requirement of a smaller amount of wire for a cushion, better contouring of the seating surface of the cushion, and the bending of the loops in relation to the twisting of the joined transverse straight portions to produce a greater flexibility in the cushion surface. The spring strip of this invention also permits the formation of a V supporting portion under the front or rear edge of the strip, integral with the strip, which was not practical with spring strips heretofore employed.

Accordingly, the principal objects of the present invention are: to provide an improved sinuous spring strip having alternately oppositely facing loops connected together by transverse straight portions in which the loops are substantially longer than the straight portions and the deflection of the spring under load is more evenly distributed through the entire length of the spring stock; to provide an improved spring strip of this type which has improved spring characteristics and requires less stock for its manufacture than previous sinuous spring strips of equal load bearing capacity; to provide an improved spring strip of this type in which the radius of the loop portions is approximately equal to the length of the transverse straight portions, which provides better contouring of a seating surface under load, and which is characterized by improved flexibility and improved uniformity of deflection along its length relative to prior sinuous spring strips of this general type; and in general to provide an improved sinuous spring strip of this character which is durable in service and economical to manufacture.

These and other objects and advantages of the invention will become apparent in the following detailed description of a preferred embodiment thereof taken together with the drawing wherein.

Figure 1:
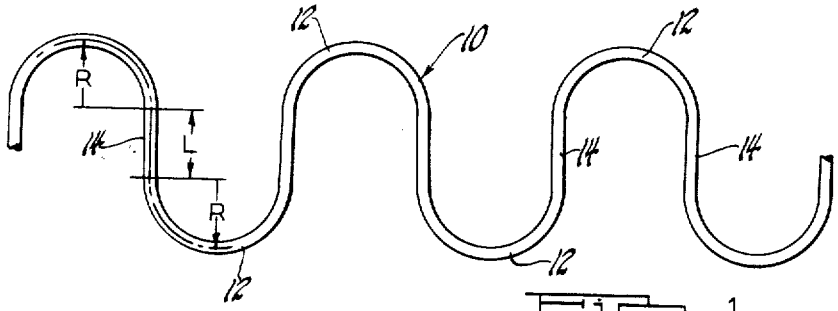
FIGURE 1 is a fragmentary plan view of a sinuous spring strip representing a preferred embodiments of the invention.

Referring more particularly to the drawing, FIGURE 1 illustrates a preferred embodiment of the invention wherein spring strip, illustrated generally by the numeral 10, has alternately oppositely facing loop portions 12 and transversely extending straight portions 14. The loop portions 12 have a radius R which is approximately equal to the length L of the straight portions 14 between the loops 12. In using the spring strip 10 for seating purposes, as compared to use in a seat back support the spring strip is preferably formed from wire stock of from 7 to 10 gauge, as measured by the well known gauge standards in the art. When using the spring strip 10 in seat back installations, the preferred wire gauge is in the range of from 10 to 13 gauge as measured by well known standards in the trade.

Figure 4:
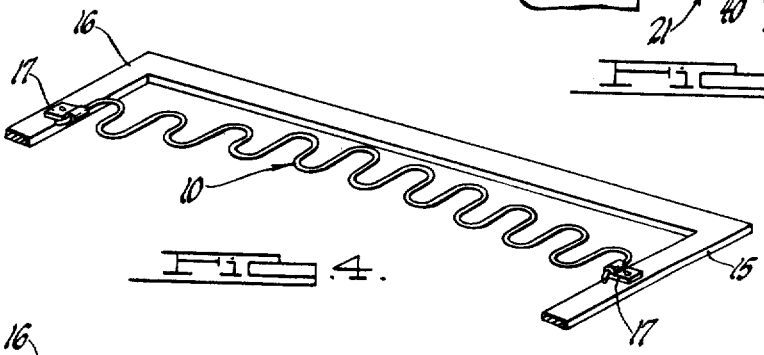
FIGURE 4 is a partial perspective view of one form of mounting of the spring strip illustrated in FIGURE 1 in a frame.

In use, a plurality of spring strips 10 are mounted in side-by-side relation in a seat or seat back frame. The strip 10 is formed in an arc longitudinally thereof in the manufacturing process so that when the strip is mounted in the frame the center of the strip is higher than the ends thereof. As illustrated in FIGURE 4, spring strip 10 is mounted on front and back frame elements 15 and 16 by sheet metal clips 17. As illustrated, the center portion of the span of spring strip 10 is higher than the ends secured in clips 17.

Figure 5:
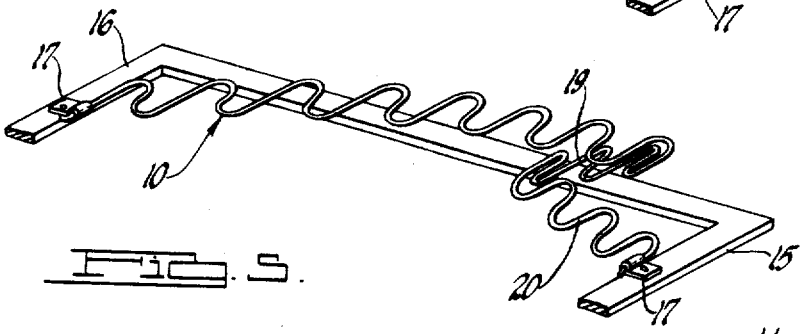
FIGURE 5 is a partial perspective view of another form of mounting of the spring strip illustrated in FIGURE 1 in a frame.

Alternatively, spring strips 10 may be be provided with a V supporting portion 18, as illustrated in FIGURE 5, wherein the forward end of strip 10 is bent downwardly and rearwardly, as at 19, and then downwardly and forwardly, as at 20. The extreme ends of the strip are secured to the frame members 15 and 16 by clips 17.

Spring strip 10 may be conveniently made by a machine of the type disclosed and claimed in the patent to Frank J. Horton, No. 2,998,045, issued August 29, 1961, for "Spring Forming and Cut-Off Machine," assigned to the present assignee. In the machine described in that application, straight wire spring stock is bent back and forth about pins having enlarged head portion to produce the oppositely presenting loops 12 along the strip edges, joined by the transverse straight portions 14. The loops 12 are given a circular curvature on a radius R, approximately equal to the length L of the transverse straight portions 14, thereby providing a relatively high degree of flexibility in the loops 12 so that they bend longitudinally when the spring is loaded and contribute to the desired contouring of the spring under load. The straight portions 14 are shorter and are spaced apart a greater distance than the straight portions of similar prior art sinuous spring strips, and therefore do not twist as much for a given load thereby providing a greater resistance to deflection. The larger loop portions 12 are bendable lengthwise of the strip under an applied load. The combination of less twist in the straight portions 14 and the bending of the larger loop portions 12 produces a more desirable deflection along the entire length of the strip and an improved contouring of a seating surface constructed from a plurality of the strips. The spring strip is formed to have a longitudinal curvature for proper mounting and contouring in a frame structure in a manner such as is described in the aforementioned Patent No. 2,998,045.

In an actual embodiment of the invention, the straight portions 14 of the spring strip were formed approximately 1 inch in length and the radius of the loops 12 were formed approximately 1 inch. Thus, the straight portions 14 were spaced apart approximately 2 inches. Since the radius of the loops 12 were approximately 1 inch and the portions 14 were approximately 1 inch, the overall width of the strip was approximately 3 inches. When a plurality of strips of this type were mounted in a frame in the manner illustrated in FIGURE 4, and spanning a distance of substantially 25 inches, it was found that the resistance to deflection was such as to support a load substantially above the frame so that bottoming would not occur. This substantial support was provided by four of the strips of the present invention where heretofore the same width of seat cushion required five strips of the type now employed in the trade. When four strips were formed in the prior art manner, and made from the same gauge wire as in the actual embodiment of the invention, spanning the same length of seat, the same load caused the seat to bottom in the frame. It was found that at least five of the prior art spring strips were required to support the same load. Thus, a substantial saving in the cost of each strip results from the use of the larger loops, thus requiring less loops and less wire. By eliminating one out of five strips, considerable further saving in cost results. The reduction in twist to the straight portions 14 and the bending of the loop portions 12 out of the plane of the spring strip permits the strips of a seat cushion to assume a desired flat S-shaped contour which is desirable to obtain the greatest comfort.

Because of the bending and twisting action of the straight portions 14 and the loops 12 of the spring strip 10, it is possible to form the spring strip with a V-supporting portion 18, as illustrated in FIGURE 5. Such V support could not be formed in the type of spring strip heretofore used in the trade because of the close spacing of the straight portions and the small radius of the loops. It is well known that such prior art spring strips collapse under load, the V portion offering no spring support and pivoting upwardly and rearwardly about the front connection to the frame. In the spring strip 10, provided with the V front support, the deflection characteristics provide the proper support and spring action so that the main span of the spring strip 10 properly contours and supports the load. The V portion 18 gives when the spring strip is loaded so as not to bear too heavily against the backs of the legs of the occupant, thus providing the optimum spring support.

In another actual embodiment of the spring strip 10, wherein the spring strip was formed for use in a seat back, and having the same relationship between the length of the straight portions and the radius of the loop, the spring strip provided a soft comfortable, and durable back cushion for a seat. This support was provided by four of the spring strips of the present invention where heretofore the same construction required five spring strips of the type now employed in the trade.

Figure 2:
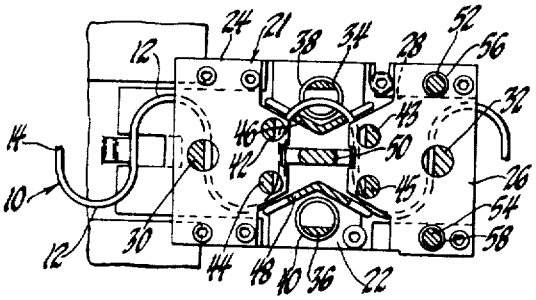
FIGURE 2 is a horizontal section of a cut-off die assembly in which continuous spring stock according to the invention is cut to length.
Figure 3:
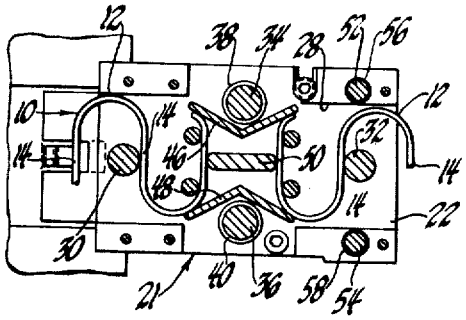
FIGURE 3 is a horizontal section on a line below the section line of FIGURE 2 showing the die assembly in a different position, and with the stock cut and end-formed.

A die assembly, indicated generally by the numeral 21, for cutting the spring strip 10 to length and to form individual spring elements, as illustrmated in FIGURES 2 and 3. The construction and operation of the die assembly 21 is described and claimed in the patent to Zygmunt M. Surletta. No. 3,071,168, issued January 1, 1963, for "Cutting and Bending Dies for Spring Strip," and assigned to the present assignee. It is particularly adapted for use in a machine of this type disclosed in the hereinabove identified Horton application, and includes a female die 22 which is normally fixed to a rigid portion of the machine frame and which is apertured to receive the male portions of the movable die (not separately designated) which is supported above it for vertical reciprocatory movement. A pair of flanged cover plates 24 and 26 are fitted over the fixed die 22, and define in conjunction therewith a longitudinal guideway 28 through which the strip 10 is intermittently fed.

Actuation of the die assembly 21 is controlled by a timer mechanism which counts the incremental advances of the spring strip 10 through the guideway 28 and effects actuation of the movable upper die at predetermined intervals for cutting the spring strip into individual elements of predetermined length and for forming the ends thereof.

The die assembly 21 is symmetrical about the longitudinal axis of the spring strip and is arranged to cut and end-form the spring strip regardless of its position in the guideway 28, that is, whether a loop 12 on the left side or on the right side of the strip is to be cut. The upper movable die includes a pair of end members 30 and 32 longitudinally spaced with respect to the spring strip 10 so that when the die is actuated they cammingly engage and squeeze slightly together the outermost two of the four transverse straight portions 14 which are positioned within the guideway 28, firmly positioning the spring strip 10 longitudinally with respect to the die assembly. After the end members 30 and 32 have contacted the spring strip and positioned it longitudinally with respect to the die, a central part of one of the loops 12 is cut out of the loop by one or the other of two punches 34 and 36 which fittingly enter into hardened steel bushings 38 and 40 in the female die 22 for shearing the wire stock. The movable die also carries four anvil pins 42, 43, 44, and 45, which engage the central transverse portions 14 as the movable die moves downwardly on the cutting portion of its stroke, and around which the cut ends of the strip are bent by one or the other of a pair of spreaders 46 and 48. The spreaders 46 and 48 are of V-shape horizontal section, and are disposed laterally inwardly of the punches 34 and 36 and transversely in line therewith. A central member 50 of generally rectangular cross section cooperates with the [anvile] *anvil* pins 42–45 to hold the stock firmly in position while it is being end-formed. The two spreaders 46 and 48 are cooperatively arranged so that the spreader opposite from the one doing the end-forming acts as a lateral support to hold the strip against lateral displacement within the guideway despite the lateral urging of the spreader 46 or 48 which bends the end portions of the stock around the anvil pins.

The upper movable die is maintained always in a fixed alignment and registry with the fixed die 22 by means of a pair of guide pins 52 and 54 which are positioned on opposite sides of the guideway 28, and are fixed to the upper movable die and slide within bushings 56 and 58 mounted in the fixed die 22.

After the spring strip 10 is cut to length and end-formed to form individual spring elements of predetermined length, the individual elements may be readily mounted on a frame to form a seating surface or the like of improved flexibility and resilience resulting from the improved proportionality between the lengths of the straight portions 14 and the loop portions 12 as hereinabove explained. Such improved proportionality permits the use of a lesser number of spring strips 10 in a frame structure than was heretofore possible with spring strips known in the trade. Furthermore, because the radius of the loop portions of the spring strip are substantially greater than the spring strips heretofore known, a considerable saving in cost is obtained. Not only through the use of a lesser number of springs, but also through the use of less wire in each individual spring.

What is claimed is:

1. A sinous spring strip made from wire bent back and forth to have oppositely facing edge loops interconnected by straight portions therebetween at the central part of the strip, the radius of the loops being the same and being substantially equal to the length of the straight portions which are approximately 1 inch in length with the overall width of the strip being approximately 3 inches, the gauge of wire, when the spring strip is employed in a seat cushion being approximately 8 gauge and, when employed in a back cushion, being approximately 11 gauge.

2. A sinuous spring strip for a seat cushion made from wire of from 7½ to 8½ gauge and of sinuous form having offset oppositely facing edge loops interconnected by straight wire portions centrally of the strip, the straight portions being disposed substantially parallel to each other and normal to the strip length, the radius of the loops being the same and being substantially equal to the length of the straight portions, the radius and lengh being approximately 1 inch.

3. A sinuous strip made from 10 to 13 gauge wire and of sinuous form to have offset oppositely facing edge loops interconnected by straight wire portions centrally of the strip for use on a back cushion, the straight portions being disposed substantially parallel to each other and normal to the length of the strip, the radius of the loops being substantially equal to the straight portions which are approximately 1 inch in length providing an overall width to the spring strip of approximately 2½ to 3¼ inches, the back cushion providing comfort as well as support.

4. A sinuous spring strip made from wire of from 7 gauge to 13 gauge bent back and forth to have oppositely facing edge loops interconnected by straight portions therebetween at the central part of the strip, the radius of the loops being the same and being substantially equal to the length of the straight portions which are approximately 1 inch in length.

5. The spring strip set forth in claim 4 wherein one end of said strip is bent first downwardly and toward the other end of said strip and then downwardly and away from said other end of said strip to provide a V supporting portion for said one end of said spring strip.

6. A seat structure comprising:

a frame having front and rear elements;

a sinuous spring strip secured at the ends thereof to said front and rear frame elements and made from wire bent back and forth to have oppositely facing edge loops interconnected by straight wire portions medially of the length of the strip, and straight portions being disposed substantially parallel to each other and normal to the length of said strip, the radius of said loops being the same and being substantially equal to said straight portions and being approximately 1 inch in length, said wire being of from 7 gauge to 13 gauge as to permit said loops to bend along the length of the strip when said straight portions are substantially stressed in torsion.

7. The seat structure set forth in claim 6 wherein the front end of said spring strip is bent first downwardly and toward the other end of said strip and then downwardly and away from said other end of said strip for forming a V supporting portion to provide a resilient edge to said seat structure.

8. The seat structure set forth in claim 6 wherein said wire forming said spring strip is from 7 to 10 gauge when said seat structure is employed in a seat cushion.

9. The seat structure set forth in claim 6 wherein said wire forming said spring strip is from 10 to 13 gauge when said seat structure is employed in a back cushion.

*10. A sinuous spring strip made from wire bent back and forth to have oppositely facing edge loops interconnected by straight portions therebetween at the central part of the strip, the radius of each of the loops being substantially equal to the length of each of the straight portions which are between ⅜ inch and 1¼ inch in length.*

*11. A sinuous spring strip made from wire bent back and forth to have offset oppositely facing edge loops interconnected by straight wire portions centrally of the strip, the straight portions being disposed substantially parallel to each other and normal to the length of the strip, the radius of each of he loops being substantially equal to the length of each of the straight portions which are between ⅜ inch and 1¼ inch in length.*

*12. A seat structure comprising a frame having first and second spaced elements; a sinuous spring strip secured at the ends thereof to said respective frame elements and made from wire bent back and forth to have oppositely facing edge loops interconnected by straight portions centrally of the strip; the straight portions being disposed substantially parallel to each other and normal to the length of the strip, the radius of each of the loops being substantially equal to the length of each of the straight portions which are between ⅜ inch and 1¼ inch in length.*

References Cited

The following references, cited by the Examiner, are of record in the patented file of this patent or the original patent.

UNITED STATES PATENTS

| | | | |
|---|---|---|---|
| 2,578,958 | 12/1951 | Winters | 267—1 |
| 2,639,763 | 5/1953 | Neely | 267—1 |
| 2,669,290 | 2/1954 | Neely | 267—107 |
| 2,684,844 | 7/1954 | Flint et al. | 267—1 |
| 2,745,472 | 5/1956 | Flint | 267—109 |
| 2,829,880 | 4/1958 | Staples et al. | 267—1 |

FOREIGN PATENTS

| | | |
|---|---|---|
| 982,054 | 1/1951 | France. |

ARTHUR L. LA POINT, *Primary Examiner.*

Dedication

Reissue No. 26,373.—*Henry Hopkes, Jr.*, Grosse Pointe Park, Mich. SINUOUS SPRING STRIP. Reissue patent dated Apr. 16, 1968. Disclaimer filed Apr. 14, 1969, by the assignee, *Lear Siegler, Inc.*

Hereby enters this disclaimer to all the claims of said patent.

[*Official Gazette August 12, 1969.*]